US010217188B2

(12) United States Patent
Ritter et al.

(10) Patent No.: US 10,217,188 B2
(45) Date of Patent: Feb. 26, 2019

(54) SYSTEMS AND METHODS FOR AGGREGATING AND FACILITATING THE DISPLAY OF SPATIALLY VARIABLE GEOGRAPHIC DATA ACQUIRED BY AIRBORNE VEHICLES

(71) Applicant: SlantRange, Inc., San Diego, CA (US)

(72) Inventors: Michael Ritter, San Diego, CA (US); Michael Milton, San Diego, CA (US)

(73) Assignee: SlantRange, Inc., San Diego, CA (US)

( * ) Notice: Subject to any disclaimer, the term of this patent is extended or adjusted under 35 U.S.C. 154(b) by 0 days.

(21) Appl. No.: 14/939,744

(22) Filed: Nov. 12, 2015

(65) Prior Publication Data

US 2016/0133039 A1 May 12, 2016

Related U.S. Application Data

(60) Provisional application No. 62/078,904, filed on Nov. 12, 2014.

(51) Int. Cl.
*G06T 3/40* (2006.01)
*G06K 9/00* (2006.01)

(52) U.S. Cl.
CPC .......... *G06T 3/4038* (2013.01); *G06K 9/0063* (2013.01)

(58) Field of Classification Search
CPC ............................ G06T 7/0042; G06T 3/4038
USPC ......................................................... 345/629
See application file for complete search history.

(56) References Cited

U.S. PATENT DOCUMENTS

| 3,392,645 | A | | 7/1968 | Stevenson |
| 3,638,026 | A | | 1/1972 | Myrsyl |
| 4,128,760 | A | | 12/1978 | Del Signore, II |
| 4,799,044 | A | | 1/1989 | Masters |
| 6,341,632 | B1 | * | 1/2002 | Sorvik ................... A01G 23/08 144/3.1 |

(Continued)

OTHER PUBLICATIONS

PCT Application No. PCT/US2015-060382, filed Nov. 12, 2015; International Search Report and Written Opinion, dated Jun. 6, 2016; 8 pages.

(Continued)

*Primary Examiner* — Samantha (Yuehan) Wang
*Assistant Examiner* — Michael Le
(74) *Attorney, Agent, or Firm* — Pillsbury Winthrop Shaw Pittman LLP

(57) ABSTRACT

Spatially variable data associated with a geographical region such as a map or image from multiple samples acquired by one or more airborne vehicles taken across sub-regions of the geographical region may be aggregating and displayed. High-resolution image data of a geographical region acquired by one or more airborne vehicles may be obtained. The image data may comprise images corresponding to sub-regions of the geographical region. The images may be acquired at an image resolution corresponding to a first spatial frequency. Individual images may be analyzed to determine statistical information corresponding to the sub-regions of the geographical region. The statistical information corresponding to the sub-regions of the geographical region may be provided, for presentation to a user, by resampling the statistical information based on a second spatial frequency. The second spatial frequency may be equal to or less than the first spatial frequency.

26 Claims, 6 Drawing Sheets

(56) References Cited

U.S. PATENT DOCUMENTS

| | | | |
|---|---|---|---|
| 6,422,508 B1 | 7/2002 | Barnes | |
| 6,792,684 B1* | 9/2004 | Hyyppa | G01B 11/00 |
| | | | 33/1 A |
| 6,963,405 B1 | 11/2005 | Wheel | |
| 7,088,261 B2 | 8/2006 | Sharp | |
| 7,346,217 B1* | 3/2008 | Gold, Jr. | G06K 9/0063 |
| | | | 348/208.4 |
| 8,174,693 B1 | 5/2012 | Matthews | |
| 8,352,105 B2 | 1/2013 | Barnes | |
| 8,544,573 B2 | 10/2013 | Gettings | |
| 8,583,296 B2 | 11/2013 | Allen | |
| 8,665,340 B2 | 3/2014 | Prentice et al. | |
| 9,064,150 B2* | 6/2015 | Eswara | G06K 9/00637 |
| 9,619,711 B2* | 4/2017 | Ouzounis | G06T 9/008 |
| 2002/0041377 A1 | 4/2002 | Hagiwara | |
| 2003/0063338 A1 | 4/2003 | Gudaitis | |
| 2005/0149235 A1* | 7/2005 | Seal | A01B 79/005 |
| | | | 700/283 |
| 2005/0151965 A1 | 7/2005 | Bissett | |
| 2005/0205758 A1 | 9/2005 | Almeida | |
| 2005/0276440 A1 | 12/2005 | Rhoades et al. | |
| 2007/0002138 A1* | 1/2007 | Oldroyd | G06T 17/05 |
| | | | 348/143 |
| 2007/0046448 A1 | 3/2007 | Smitherman | |
| 2007/0200052 A1 | 8/2007 | Seyfried | |
| 2008/0178653 A1 | 7/2008 | Gunstream | |
| 2009/0295910 A1 | 12/2009 | Mir | |
| 2010/0013979 A1 | 1/2010 | Golub | |
| 2011/0110562 A1* | 5/2011 | Kelle | G01C 11/00 |
| | | | 382/110 |
| 2012/0105274 A1* | 5/2012 | Andersson | G01S 13/90 |
| | | | 342/25 A |
| 2012/0109614 A1 | 5/2012 | Lindores | |
| 2012/0293803 A1 | 11/2012 | Arai | |
| 2012/0321321 A1 | 12/2012 | Riesebosch | |
| 2013/0278576 A1 | 10/2013 | Lee | |
| 2014/0022381 A1 | 1/2014 | Heinold | |
| 2014/0050406 A1 | 2/2014 | Buehler | |
| 2014/0132778 A1 | 5/2014 | Holub | |

OTHER PUBLICATIONS

International Preliminary Report on Patentability PCT/US2015/060382 dated May 16, 2017.

* cited by examiner

SYSTEMS AND METHODS FOR AGGREGATING AND FACILITATING THE DISPLAY OF SPATIALLY VARIABLE GEOGRAPHIC DATA ACQUIRED BY AIRBORNE VEHICLES

CROSS REFERENCE TO RELATED APPLICATIONS

This application claims the priority benefit of U.S. Provisional Patent Application No. 62/078,904 filed on Nov. 12, 2014 and entitled "SYSTEM AND METHOD FOR AGGREGATING IMAGE DATA OBTAINED BY AIRBORNE VEHICLES," which is incorporated herein by reference.

FIELD OF THE DISCLOSURE

This disclosure relates to systems and methods for aggregating and facilitating display of spatially variable data associated with a geographical region such as a map or image from multiple samples acquired by one or more airborne vehicles taken across sub-regions of the geographical region.

BACKGROUND

The timely measure of information associated with an agricultural crop, including its emergent plant and weed densities, its current health, its projected health trajectory, the presence of invasive species or other damaging conditions, and/or other parameters are of prime importance to agricultural producers. The aim of the timely measurement of agricultural crop parameters is to maximize yields with the minimum of input costs, waste, and burden to society and environment. This measurement has typically been performed using human labor to survey agricultural fields on a regular schedule as monitors for emerging health conditions. The economics of manual crop scouting, however, limits surveys to select locations within production fields such that large fractions of acreage are never sampled, and problems frequently emerge undetected with losses to crop yield.

Airborne and spaceborne data collection systems have been employed to replace and/or complement human labor in scouting for issues within agricultural crops. Such systems include manned and unmanned aerial systems (UAS). Current systems employ expensive, complex and processor-intensive methods to extract meaningful information from the measurements taken by instruments aboard them.

Airborne imaging systems that are limited to low altitudes and narrow fields of view must collect numerous individual images in order to provide total coverage of a subject target. These individual images (which may number in the thousands depending on field size, altitude, and sensor field of view) are traditionally aggregated into a larger single image mosaic in order to extract meaningful information. This process is commonly referred to as "mosaicking" or "stitching" and existing methods are inadequate for multiple reasons.

Mosaicking algorithms rely on correlating spatial features between and among adjacent images to determine proper relative placement. This is a computationally intensive process that grows exponentially with the number of images in the mosaic.

Mosaicking algorithms were designed to stitch together images containing unique and easily identifiable features and are poorly suited to imagery with repeating spatial patterns as is inherent in agricultural crops. Furthermore, repeating spatial patterns vary by crop type and some crops yield virtually no unique patterns at sampling scales greater than a couple of centimeters. These methods are therefore not very portable from crop to crop and often yield no solution at all.

The effectiveness of a mosaicking algorithm increases with increasing correlation between adjacent images. Mosaicking tools therefore recommend a percentage of scene overlap in the image collection to assure a solution. For agricultural crops, the recommended overlap can be up to 90%, which imposes large costs in terms of the required flight time to complete a survey, the volume of data to process, and the time and processing resources required to compute a solution.

Once relative placement is determined, overlapping regions must be blended to avoid discontinuity artifacts. The selection of an appropriate blending mix is computationally intensive and subjective based on local conditions.

As a specific example, the creation of a mosaic for a typical 160-acre field of corn using traditional mosaicking methods can take 6-8 hours on high-cost, specialized computing resources. Not only are traditional methods inefficient and poorly suited for this task, they are unnecessary. Even if successful in rendering a result, 160 acre full-field mosaics accurate to centimeter scales are no more effective for agricultural management than mosaics with spatial resolutions of meters, provided the crop information is extracted at centimeter scales and can be rendered as a "zoomed-in" view.

SUMMARY

One aspect of the present disclosure relates to a system configured for aggregating and facilitating display of spatially variable data associated with a geographical region such as a map or image from multiple samples acquired by one or more airborne vehicles taken across sub-regions of the geographical region. Exemplary implementations may provide immediate, comprehensive, and cost-effective survey metrics such as crop density, weed density, nutrient status, health trends, yield forecasts, or other crop conditions in disadvantaged agricultural regions with limited computing or networking technology availability.

In some implementations, the system may comprise one or more hardware processors configured by machine-readable instructions. The hardware processor(s) may be configured to obtain high-resolution image data of a geographical region acquired by one or more airborne vehicles. The image data may comprise a plurality of images corresponding to sub-regions of the geographical region. The plurality of images may be acquired at an image resolution corresponding to a first spatial frequency. The hardware processor(s) may be configured to analyze individual ones of the plurality of images to determine statistical information corresponding to the sub-regions of the geographical region. The hardware processor(s) may be configured to provide, for presentation to a user, the statistical information corresponding to the sub-regions of the geographical region by resampling the statistical information based on a second spatial frequency. The second spatial frequency may be equal to or less than the first spatial frequency.

Another aspect of the present disclosure relates to a method for aggregating and facilitating display of spatially variable data associated with a geographical region such as a map or image from multiple samples acquired by one or more airborne vehicles taken across sub-regions of the geographical region. The method may be performed by one or more hardware processors configured by machine-readable instructions. The method may comprise obtaining high-resolution image data of a geographical region acquired by one or more airborne vehicles. The image data may comprise a plurality of images corresponding to sub-regions of the geographical region. The plurality of images may be acquired at an image resolution corresponding to a first spatial frequency. The method may comprise analyzing individual ones of the plurality of images to determine statistical information corresponding to the sub-regions of the geographical region. The method may comprise providing, for presentation to a user, the statistical information corresponding to the sub-regions of the geographical region by resampling the statistical information based on a second spatial frequency. The second spatial frequency may be equal to or less than the first spatial frequency.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
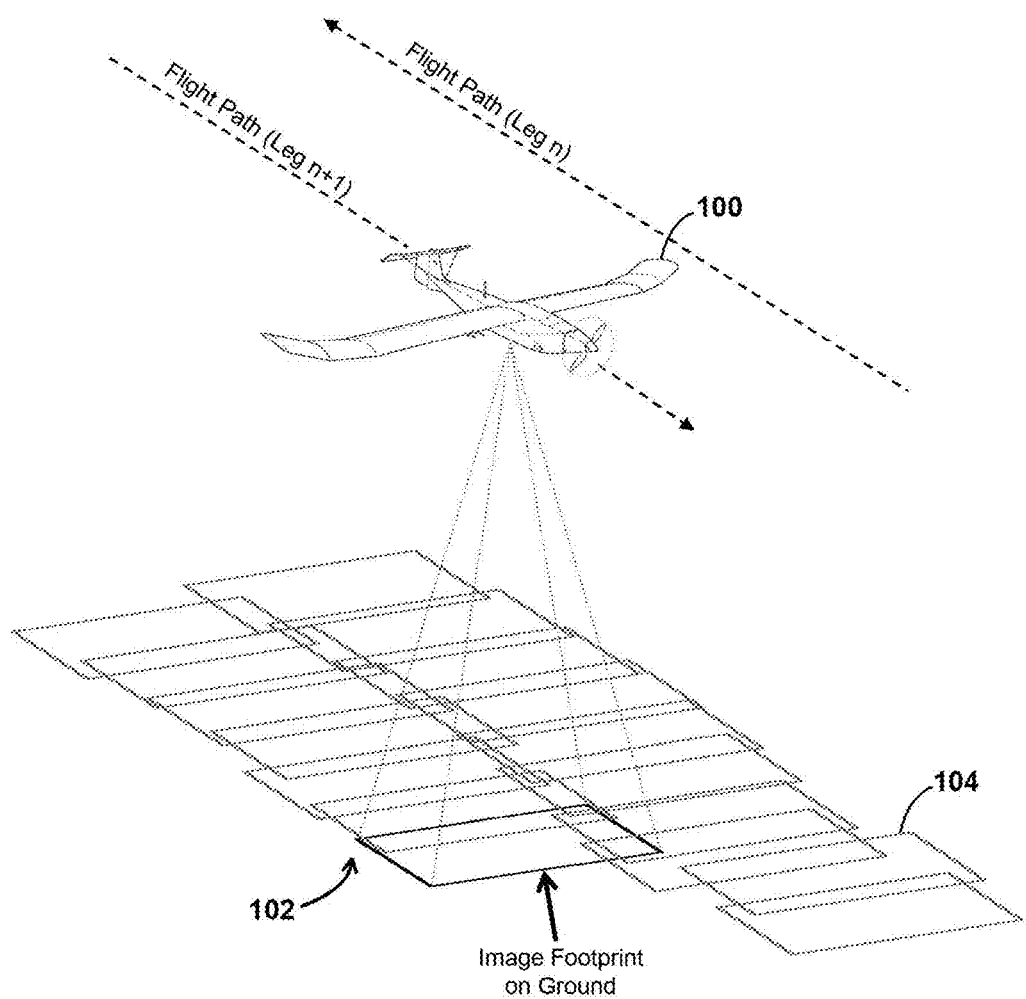
FIG. 1 illustrates an exemplary implementation of an airborne vehicle obtaining image data of a target location, in accordance with one or more implementations.

FIG. 1 illustrates an aircraft 100. The aircraft 100 is operating at a low altitude. The aircraft operating at low altitudes and low ground speeds facilitates the collection of imagery. The image(s) 104 obtained by the airborne vehicle 100 may have spatial resolutions smaller than the characteristic dimensions of the target 102. For example, in the agricultural industry, the image 104 obtained by the airborne vehicle 100 may have spatial resolutions smaller than the characteristic dimensions of target vegetation. Individual elements of the images 104 obtained by the airborne vehicle 100 of the target 102 may be filtered based on one or more parameters. Such parameters may include a level of noise. For example, where the elements of the image are pixels, pixels having a high level of noise may be filtered. Noise may be defined as any signal type other than the signal of the target 102. The images 104 obtained of the target 102 may be further analyzed.

In some implementations, aircraft 100 may include one or more sensors disposed thereon. The one or more sensors may include one or more of an imaging sensor, a position sensor, an attitude sensor, a temperature sensor, and/or other sensors. The imaging sensor may be configured to provide an image signal conveying information related to visual information, luminous intensity, spectral information, thermal information, topographic or plant height information, and/or other image-related information. The position sensor may be configured to provide a position signal conveying information related to a position or geo-location of aircraft 100 at the time of individual image acquisitions. The attitude sensor may be configured to provide an attitude signal conveying information related to an attitude of aircraft 100 at the time of individual image acquisitions. By way of non-limiting example, information related to the attitude may include roll, pitch, and/or yaw orientation of the sensor with relation to the target 102.

Figure 1A:
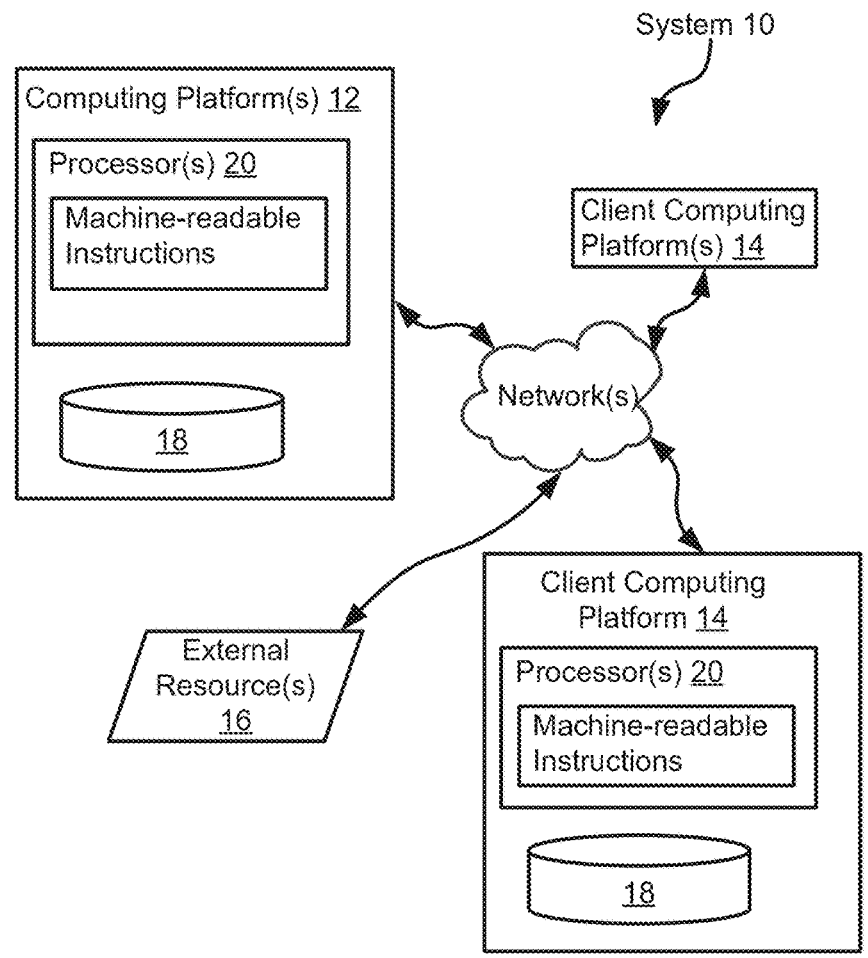
FIG. 1A illustrates an exemplary system in which one or more implementations may be realized.

FIG. 1A illustrates an exemplary system ("system 10") in which one or more implementations may be realized. In some implementations, system 10 may include one or more computing platforms 12. In some implementations, one or more components attributed to computing platform(s) 12 may reside in an airborne platform such as an unmanned aerial vehicle, a manned aerial vehicle, and/or other airborne platforms. The users may access system 10 via computing platform(s) 12 and/or user computing platform(s) 14. The computing platform(s) 12 and user computing platform(s) 14 may be configured to execute machine-readable instructions.

In some implementations, the computing platform(s) 12, user computing platform(s) 14, and/or external resource(s) 16 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which computing platform(s) 12, user computing platform(s) 14, and/or external resource(s) 16 may be operatively linked via some other communication media.

A given user computing platform 14 may include one or more processors configured to execute machine-readable instructions. The machine-readable instructions may be configured to enable an expert or user associated with the given user computing platform 14 to interface with system 10 and/or external resource(s) 16, and/or provide other functionality attributed herein to user computing platform(s) 14. By way of non-limiting example, the given user computing platform 14 may include one or more of a desktop computer, a laptop computer, a handheld computer, a tablet computing platform, a NetBook, a Smartphone, a gaming console, and/or other computing platforms.

External resource(s) 16 may include sources of information, external entities participating with system 10, and/or other resource(s). In some implementations, some or all of the functionality attributed herein to external resource(s) 16 may be provided by resource(s) included in system 10.

Computing platform(s) 12 and/or user computing platform(s) 14 may include electronic storage 18, one or more processors 20, and/or other components. Computing platform(s) 12 may include communication lines, or ports to enable the exchange of information with a network and/or other computing platforms. Illustration of computing platform(s) 12 in FIG. 1A is not intended to be limiting. Computing platform(s) 12 may include a plurality of hardware, software, and/or firmware components operating together to provide the functionality attributed herein to computing platform(s) 12. For example, computing platform(s) 12 may be implemented by a cloud of computing platforms operating together as computing platform(s) 12.

Electronic storage 18 may comprise non-transitory storage media that electronically stores information. The electronic storage media of electronic storage 18 may include one or both of system storage that is provided integrally (i.e., substantially non-removable) with computing platform(s) 12 and/or removable storage that is removably connectable to computing platform(s) 12 via, for example, a port (e.g., a USB port, a firewire port, etc.) or a drive (e.g., a disk drive, etc.). Electronic storage 18 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 18 may include one or more virtual storage resource(s) (e.g., cloud storage, a virtual private network, and/or other virtual storage resource(s)). Electronic storage 18 may store software algorithms, information determined by processor(s) 20, information received from computing platform(s) 12, information received from user computing platform(s) 14, and/or other information that enables computing platform(s) 12 to function as described herein.

Processor(s) 20 may be configured to provide information processing capabilities in computing platform(s) 12 and 14. As such, processor(s) 20 may include one or more of a digital processor, an analog processor, a digital circuit designed to process information, an analog circuit designed to process information, a state machine, and/or other mechanisms for electronically processing information. Although processor(s) 20 is shown in FIG. 1A as a single entity, this is for illustrative purposes only. In some implementations, processor(s) 20 may include a plurality of processing units. These processing units may be physically located within the same device, or processor(s) 20 may represent processing functionality of a plurality of devices operating in coordination. Processor(s) 20 may be configured to execute machine-readable instructions and/or components of machine-readable instructions by software; hardware; firmware; some combination of software, hardware, and/or firmware; and/or other mechanisms for configuring processing capabilities on processor(s) 20. As used herein, the term "component" may refer to any component or set of components that perform the functionality attributed to the component. This may include one or more physical processors during execution of processor readable instructions, the processor readable instructions, circuitry, hardware, storage media, or any other components.

In some implementations, processor(s) 20 may be configured by machine-readable instructions to obtain high-resolution image data of a geographical region acquired by one or more airborne vehicles (e.g., aircraft 100 in FIG. 1). The image data may comprise a plurality of images (e.g., image 104 in FIG. 1) corresponding to sub-regions of the geographical region. The plurality of images may be acquired at an image resolution corresponding to a first spatial frequency. For example, the ground-projected image resolution may be less than 5 cm or a spatial frequency of more than one pixel per 5 cm. In some implementation, image data of the geographical region may include one or more of a color image, a monochrome image, a multispectral image, a hyperspectral image, a thermal image, a ranging or other image from lidar, a radar image, a sonic range image, and/or other types of images.

In some implementations, processor(s) 20 may be configured by machine-readable instructions to analyze individual ones of the plurality of images to determine statistical information corresponding to the sub-regions of the geographical region. In accordance with some implementations, analyzing the individual ones of the plurality of images to determine the statistical information corresponding to the sub-regions of the geographical region may include analyzing multiple sub-sub-regions per a given one of the plurality of images. The statistical information may include and/or may relate to one or more of agricultural vegetation growth, non-agricultural vegetation growth, soil conditions, livestock animal populations, non-livestock animal populations, bodies of water, developed land, undeveloped land, and/or other statistical information.

In some implementations, processor(s) 20 may be configured by machine-readable instructions to provide, for presentation to a user (e.g., via client computing platform(s) 14), the statistical information corresponding to the sub-regions of the geographical region by resampling the statistical information based on a second spatial frequency. The second spatial frequency may be equal to or less than the first spatial frequency. The statistical information may be provided for presentation to the user in real-time or near-real-time during acquisition of the high-resolution image data by the one or more airborne vehicles.

According to some implementations, individual ones of the plurality of images may be divided into an array of m×n sub-regions for statistical analysis, where individual m×n sub-regions comprise k×l pixels at the native resolution of the image. The statistical information of individual ones of the m×n sub-regions may be projected to a geographical coordinate based on one or more of position, attitude, and optical characteristics of the one or more sensors disposed on the one or more airborne vehicles at a time of acquisition.

The projected statistical information of individual ones of the sub-regions may be resampled onto a monotonic geoposition grid to form a single p×q map or image. The single p×q map or image may be a shape with dimensions of p pixels by q pixels. Such a shape may include a polygon such as a rectangle or a parallelogram, and/or any other shape. A given pixel of the single p×q map or image may be a statistical combination of a plurality of pixels of one or more m×n sub-regions. The resampling onto the monotonic geoposition grid may be performed at a spatial frequency that is equal to or less than the spatial frequency of the m×n sub-regions. A spatial frequency of the m×n sub-regions may be dynamically adjusted to balance a target spatial frequency associated with the single p×q map or image against one or more factors. Examples of such factors may include one or more of available processing capabilities, available storage capacity, network bandwidth limitations, output display resolution capability, and/or other factors.

In some implementations, processor(s) 20 may be configured by machine-readable instructions to provide, for presentation to the user, a zoomed-in view comprising a full-resolution single image of a portion of the single p×q map or image. The full-resolution may correspond to a native resolution of a sensor that acquired individual ones of the plurality of images. The zoomed-in view may be presented simultaneously with the single p×q map or image. In some implementations, the zoomed-in view may be provided responsive to a cursor being positioned over the single p×q map or image (e.g., a "mouse-over").

Figure 2:
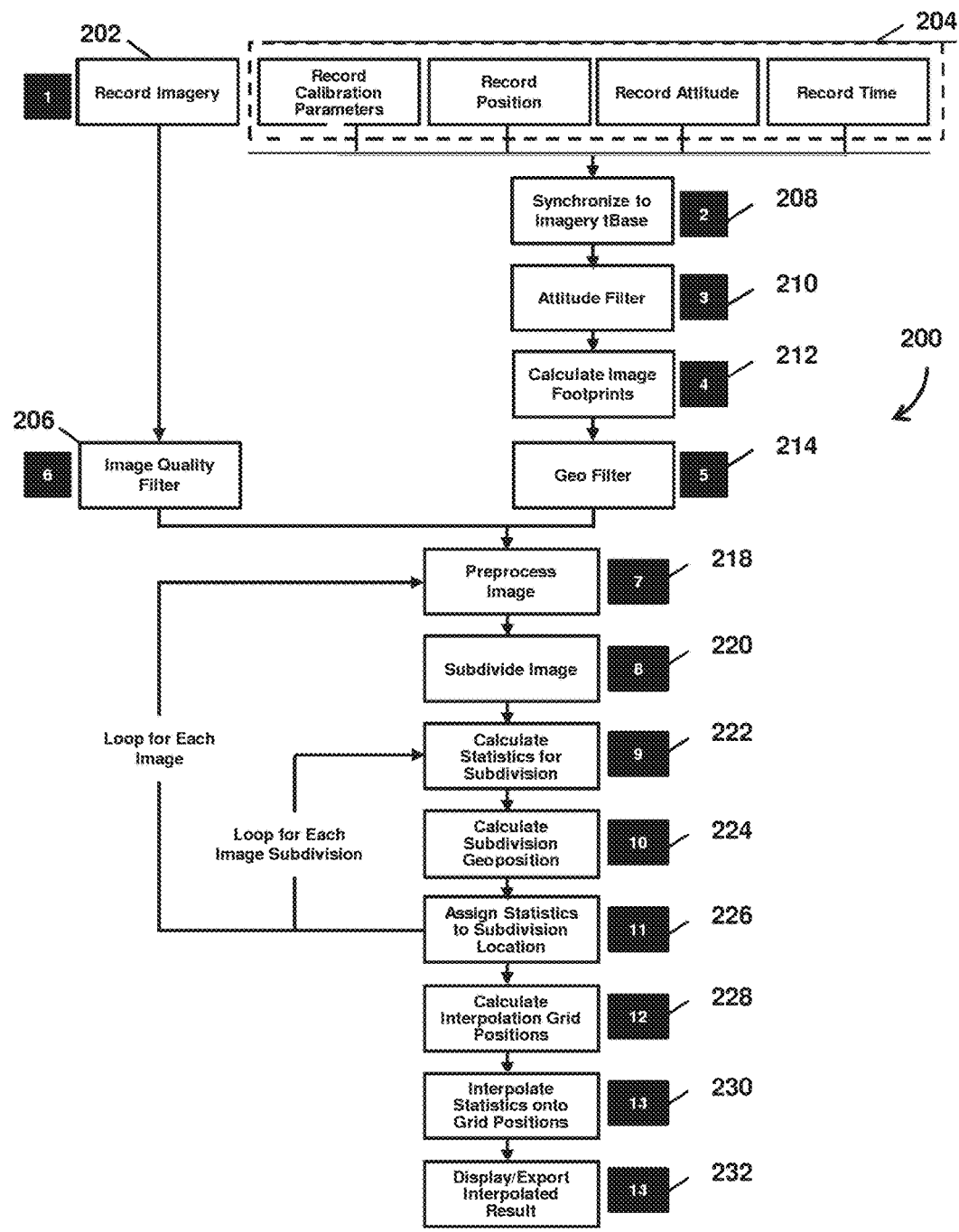
FIG. 2 illustrates a method for processing image data obtained by an airborne vehicle, in accordance with one or more implementations.

FIG. 2 illustrates a method 200 for processing images obtained by airborne vehicles of a target. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more devices may be logically and physically separate. The one or more processing devices may include one or more devices configured through hardware, firmware, and/or software to be specifically designed for execution of one or more of the operations of method 200. The one or more processing devices may include processing device(s) local to the user of the airborne vehicle. The one or more processing devices may include processing device(s) remote to the user of the airborne vehicle, such as a server and/or a central database operated by a data service provider.

At an operation 202, image data may be obtained. The image data may be obtained from a sensor onboard an airborne vehicle. Such sensors may include, but not be limited to, color sensors, monochrome sensors, multi-spectral sensors, hyperspectral sensors, and/or other sensors. The airborne vehicle, sensors and/or other elements may be included that are described in U.S. patent application Ser. No. 14/480,656 filed on Sep. 8, 2014, which is incorporated herein by reference. The image data may be obtained from an on-board storage device.

At an operation 204, metadata associated with the obtained image data may be obtained. The metadata may comprise one or more image parameters. The metadata may comprise one or more of sensor position (e.g., latitude, longitude, altitude), attitude (e.g. roll, pitch, yaw), various calibration parameters as necessary, temperature, time, and/or other metadata information associated with the image data. The metadata may comprise information associated with the airborne vehicle, the operator and/or other metadata information.

At an operation 206, an image data quality threshold may be obtained. Image data quality may relate to one or more of focus, contrast, motion blur, calibration accuracy and/or other characteristics of the image data. At an operation 206, image data falling short of the quality threshold may be filtered.

At an operation 208, the metadata obtained at operation 204 may be synchronized. Individual ones of the metadata may be synchronized with other individual ones of the metadata based on one or more parameters. The metadata may be synchronized based on time information associated with the obtained measurements comprising the metadata. The metadata may be synchronized within an acceptable margin of error. The acceptable margin of error may be provided by an administrator. The acceptable margin of error may be provided by a user of the system. The acceptable margin of error may be determined based on a statistical analysis of the metadata. At an operation 208, the metadata may be synchronized with the image data. The metadata may be synchronized with the image data based on one or more of the image parameters. The metadata may be synchronized with the image data based on time.

At an operation 210, an attitude range may be obtained. At an operation 210 image data associated with an attitude exceeding the attitude range may be filtered. At an operation 210 metadata associated with an attitude exceeding the attitude range may be filtered. The airborne vehicle may have multiple sensor configurations. As with all operations herein described, the steps performed at operation 210 may be optional. Whether certain steps are performed at an operation 210 may be depend on a number of factors including the configuration of the sensors. For example, with a strap-down sensor configuration, operation 210 may be performed. As another example, with a gimbaled sensor configuration, operation 210 may not be performed.

At an operation 212, the geographic boundaries of the image data associated with the target may be determined. Image data associated with the target may comprise ground-projected images. The geographic boundaries of those ground-projected images may be determined.

At an operation 214, a geographical boundary may be obtained. The geographical boundary may be associated with the boundary of the target. For example the geographical boundary may be associated with the boundary of a field, a farm, an area of a body of water, an area of a city, and/or other geographical area. At an operation 214, the image data associated with areas outside of the geographical boundary may be filtered. At an operation 214, the metadata associated with areas outside of the geographical boundary may be filtered.

At an operation 218, the obtained image data may be corrected. At an operation 218 the obtained image data may be calibrated. The correction and/or calibration performed may include, but not be limited to, de-vignetting, de-warping, scaling, rotating, cropping, and/or other correction and/or calibration techniques.

Figure 3:
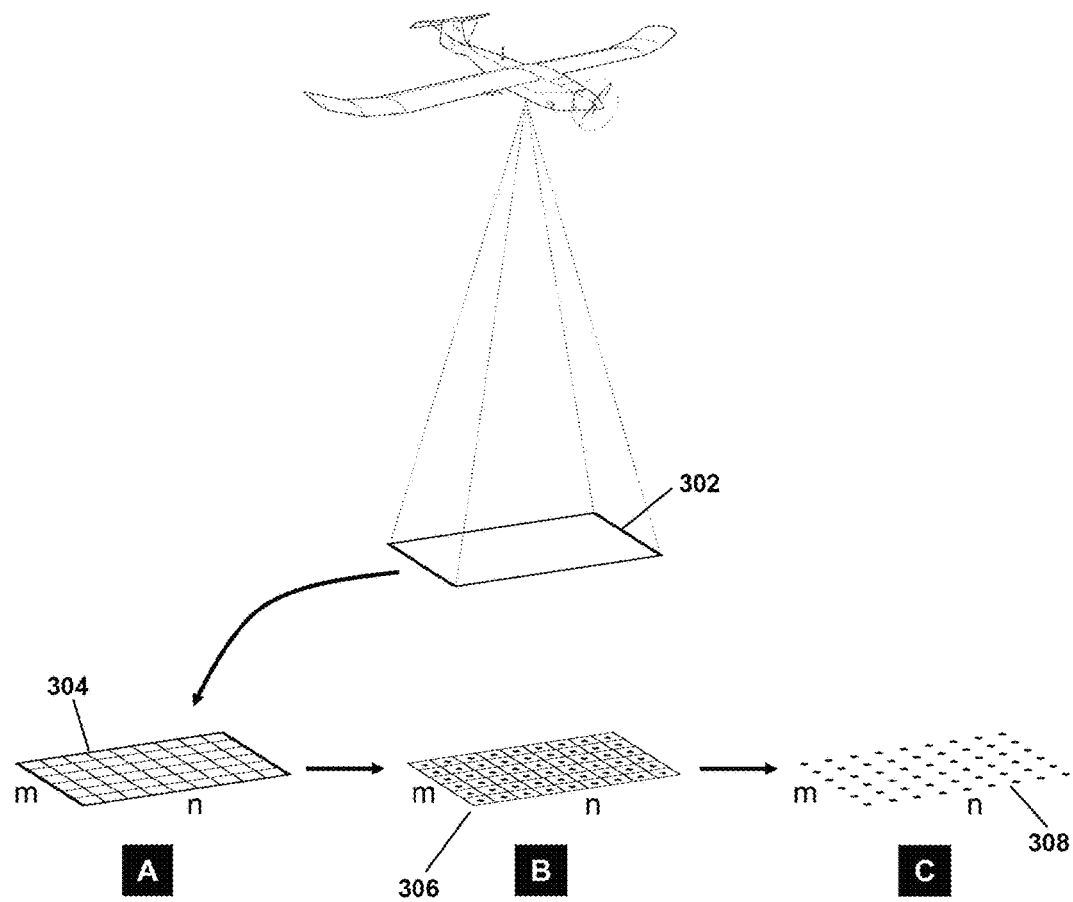
FIG. 3 is a graphical representation of subdivided image, in accordance with one or more implementations.

Referring to both FIG. 2 and FIG. 3, at an operation 220, individual images 302 of the image data may be subdivided. The individual images 302 may be subdivided into an array. The individual images 302 may be subdivided into an m×n array 304. Individual elements of the m×n array 304 may include k×l pixels of the image 302. The spatial scale of individual elements of the m×n array may be approximate to the error in the geolocation associated with the individual images in the image data.

At an operation 222, one or more statistical measures to be determined may be obtained. At an operation 222, the obtained statistical measures may be determined for individual ones of the elements 306 in the m×n array 304. When used for agricultural crops, such statistical measures may include, but not be limited to, mean normalized difference vegetation index (NDVI) and/or other spectral ratio combinations, mean stress level, plant population, mean nutrient levels, invasive species population, infestation indicators, mean hydration levels, and/or other statistical measures.

At an operation 224, the geolocations of the individual elements 308 of the m×n array 304 may be determined. The geolocations of the individual elements 308 may include latitude and longitude information. The geolocations of the individual elements 308 may be determined based on metadata associated with the image data.

Figure 4:
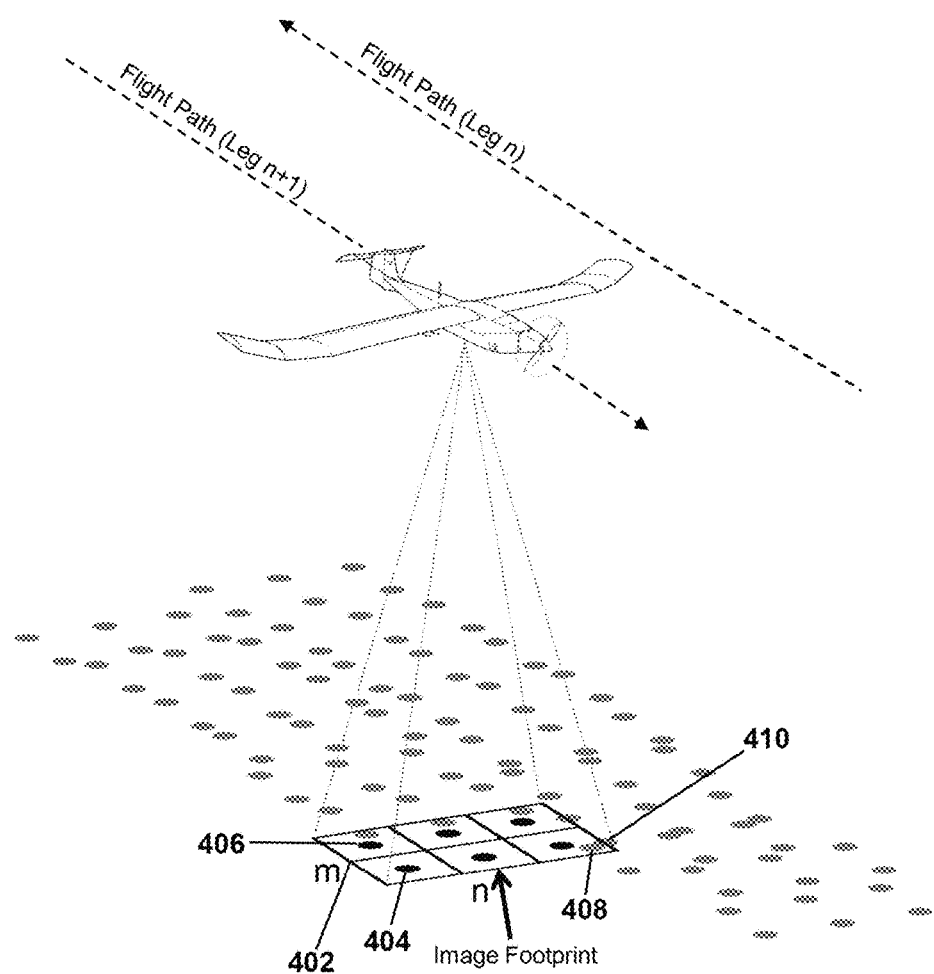
FIG. 4 is a graphical representation of assigning geolocation information to the subdivisions of the subdivided image, in accordance with one or more implementations.

At an operation 226, the statistical measures determined at operation 222 may be assigned to the geolocations of the individual elements determined at operation 224. This operation may be repeated for each of the individual images comprised in the obtained image data. At an operation 226 the aggregated statistical measurements from the individual images comprised of the obtained image data may be obtained. The aggregated statistical measurements may be referred to as a surface. FIG. 4, shows a representation of how the geolocations of subdivisions of multiple images aggregate to form a surface. After processing, individual images 402 comprise of multiple subdivisions 404 having a determined geolocation 406. Other individual images may have subdivisions having geolocations 408 and 410 at other areas.

For example, when processed for multiple subdivisions of multiple images in a given survey, a "surface" may be created whereby individual subdivisions have an x and y location. The x by y location may be associated with the geolocation of the individual subdivisions, which may be, in turn, related to the geolocation of the individual images obtained by the airborne vehicle. This positioning may result in semi-random spacing of data points in an x by y grid. The grid may be a three-dimensional grid, whereby the z values are equivalent to each of the statistical measures determined at operation 222 and assigned to the subdivisions at operation 226.

At an operation 228, a 2-dimensional grid may be defined. The 2-dimensional grid may be monotonic in both the x and y dimensions. The data points for the 2-dimensional grid may be the statistical measures assigned to the geolocations of the individual elements of the array at operation 226. Such a 2-dimensional grid may define the x and y dimensions of an interpolation grid.

At an operation 230, individual surfaces representing individual types of statistical measurements determined at operation 226 may be interpolated onto the 2-dimensional monotonic grid defined at operation 228.

Figure 5:
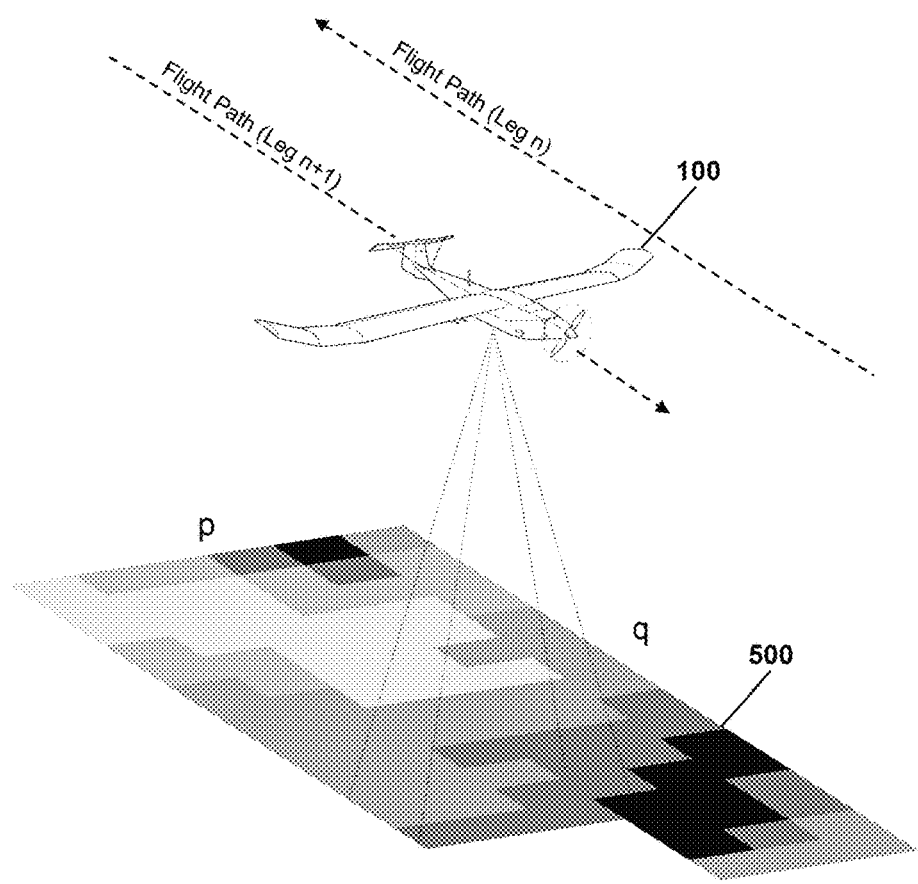
FIG. 5 is an example of a graphical representation based on the subdivided image, in accordance with one or more implementations.

At an operation 232, the individual surfaces determined at operation 230 may be rendered for display. At an operation 232, the individual surfaces determined at operation 230 may be exported. The rendering of the individual surfaces may resemble a false color map 500, such as that shown in FIG. 5.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured for aggregating and facilitating display of spatially variable data associated with a geographical region such as a map or image from multiple samples acquired by one or more airborne vehicles taken across sub-regions of the geographical region independent of data obtained from outside data sources, the system comprising:
one or more hardware processors configured by machine-readable instructions to:
obtain high-resolution image data of a geographical region acquired by one or more airborne vehicles, the image data comprising a plurality of spectral images corresponding to sub-regions of the geographical region, the plurality of spectral images being acquired at an image resolution corresponding to a first spatial frequency, wherein:
the first spatial frequency corresponds to a characteristic dimension of vegetation growth in a sub-region, such that the first spatial frequency enables segmentation of leaf elements of the vegetation growth from a background or surrounding objects; and
the image data acquired by one or more airborne vehicles further comprises information conveying a position and attitude of an airborne sensor that acquired individual ones of the plurality of images at a time the image data is obtained;
correct the spectral images for changing conditions of ambient light;
analyze individual ones of the plurality of the corrected spectral images to determine statistical information corresponding to the sub-regions of the geographical region, the analysis being independent of data obtained from outside data sources, the analysis comprising:
separating individual pixels among the plurality of the corrected spectral images into classes based on spectral content; and
calculating statistics within the classes; and
provide, for presentation to a user, the statistical information corresponding to the sub-regions of the geographical region by resampling the statistical information based on a second spatial frequency, the second spatial frequency being equal to or less than the first spatial frequency, the resampling comprising interpolating the statistics within the classes onto a surface with spatial scale similar to, or greater than, an estimated geo-positioning error of the ground-projected location of the spectral images.

2. The system of claim 1, wherein image data of the geographical region includes one or more of a color image, a monochrome image, a multispectral image, a hyperspectral image, a ranging image from lidar, a radar image, or a sonic range image.

3. The system of claim 1, wherein the statistical information is related to one or more of agricultural vegetation growth, non-agricultural vegetation growth, soil conditions, livestock animal populations, non-livestock animal populations, bodies of water, developed land, or undeveloped land.

4. The system of claim 1, wherein:
individual ones of the plurality of images are divided into an array of m×n sub-regions for statistical analysis, a given m×n sub-region being a shape with dimension of k pixels by l pixels, wherein k×l is a native resolution of a sensor that acquired individual ones of the plurality of images; and
the statistical information of individual ones of the sub-regions is projected to a geographical coordinate based on position, attitude, and optical characteristics of the one or more sensors disposed on the one or more airborne vehicles at a time of acquisition.

5. The system of claim 4, wherein the projected statistical information of individual ones of the sub-regions is resampled onto a monotonic geo-position grid to form a single p×q map or image, the single p×q map or image being a shape with dimensions of p pixels by q pixels, a given pixel of the single p×q map or image being a statistical combination of a plurality of pixels of one or more m×n sub-regions.

6. The system of claim 5, wherein the resampling onto the monotonic geo-position grid is performed at a spatial frequency that is equal to or less than the spatial frequency of the m×n sub-regions.

7. The system of claim 5, wherein a spatial frequency of the m×n sub-regions is dynamically adjusted to balance a target spatial frequency associated with the single p×q map or image against one or more of available processing capabilities, available storage capacity, or network bandwidth limitations.

8. The system of claim 5, wherein the one or more hardware processors are further configured by machine-readable instructions to provide, for presentation to the user, a zoomed-in view comprising a full-resolution single image of a portion of the single p×q map or image, the full-resolution corresponding to a native resolution of a sensor that acquired individual ones of the plurality of images, the zoomed-in view being presented simultaneously with the single p×q map or image.

9. The system of claim 1, wherein individual ones of the one or more hardware processors are disposed on the one or more airborne vehicles and/or distributed remotely from the one or more airborne vehicles.

10. The system of claim 1, further comprising one or more sensors disposed on the one or more airborne vehicles.

11. The system of claim 1, wherein the image resolution is less than 5 centimeters/pixel, and wherein the one or more hardware processors are configured to correct the spectral images for changing conditions of ambient sun-light.

12. The system of claim 1, wherein the one or more hardware processors are further configured by machine-readable instructions to provide the statistical information for presentation to the user in real-time during acquisition of the high-resolution image data by the one or more airborne vehicles.

13. The system of claim 1, wherein analyzing the individual ones of the plurality of images to determine the statistical information corresponding to the sub-regions of the geographical region includes analyzing multiple sub-sub-regions per a given one of the plurality of images.

14. A method for aggregating and facilitating display of spatially variable data associated with a geographical region such as a map or image from multiple samples acquired by one or more airborne vehicles taken across sub-regions of the geographical region independent of data obtained from outside data sources, the method being performed by one or more hardware processors configured by machine-readable instructions, the method comprising:
obtaining high-resolution image data of a geographical region acquired by one or more airborne vehicles, the image data comprising a plurality of spectral images corresponding to sub-regions of the geographical region, the plurality of spectral images being acquired at an image resolution corresponding to a first spatial frequency, wherein:
the first spatial frequency corresponds to a characteristic dimension of vegetation growth in a sub-region, such that the first spatial frequency enables segmentation of leaf elements of the vegetation growth from a background or surrounding objects; and
the image data acquired by one or more airborne vehicles further comprises information conveying a position and altitude of an airborne sensor that acquired individual ones of the plurality of images at a time the image data is obtained;
correcting the spectral images for changing conditions of ambient light;
analyzing individual ones of the plurality of the corrected images to determine statistical information corresponding to the sub-regions of the geographical region, the analysis being independent of data obtained from outside data sources, the analysis comprising:
separating individual pixels among the plurality of the spectral images into classes based on spectral content; and
calculating statistics within the classes; and
providing, for presentation to a user, the statistical information corresponding to the sub-regions of the geographical region by resampling the statistical information based on a second spatial frequency, the second spatial frequency being equal to or less than the first spatial frequency, the resampling comprising interpolating the statistics within the separated pixel classes onto a surface with spatial scale similar to, or greater than, an estimated geo-positioning error of the ground-projected location of the spectral images.

15. The method of claim 14, wherein image data of the geographical region includes one or more of a color image, a monochrome image, a multispectral image, a hyperspectral image, a ranging image from lidar, a radar image, or a sonic range image.

16. The method of claim 14, wherein the statistical information is related to one or more of agricultural vegetation growth, non-agricultural vegetation growth, soil conditions, livestock animal populations, non-livestock animal populations, bodies of water, developed land, or undeveloped land.

17. The method of claim 14, further comprising:
dividing individual ones of the plurality of images into an array of m×n sub-regions for statistical analysis, a given m×n sub-region being a shape with dimension of k pixels by l pixels, wherein k×l is a native resolution of a sensor that acquired individual ones of the plurality of images; and
projecting the statistical information of individual ones of the sub-regions to a geographical coordinate based on position, attitude, and optical characteristics of the one or more sensors disposed on the one or more airborne vehicles at a time of acquisition.

18. The method of claim 17, further comprising resampling the projected statistical information of individual ones of the sub-regions onto a monotonic geo-position grid to form a single p×q map or image, the single p×q map or image being a shape with dimensions of p pixels by q pixels, a given pixel of the single p×q map or image being a statistical combination of a plurality of pixels of one or more m×n sub-regions.

19. The method of claim 18, wherein the resampling onto the monotonic geo-position grid is performed at a spatial frequency that is equal to or less than the spatial frequency of the m×n sub-regions.

20. The method of claim 18, further comprising dynamically adjusting a spatial frequency of the m×n sub-regions to balance a target spatial frequency associated with the single p×q map or image against one or more of available processing capabilities, available storage capacity, or network bandwidth limitations.

21. The method of claim 18, further comprising providing, for presentation to the user, a zoomed-in view comprising a full-resolution single image of a portion of the single p×q map or image, the full-resolution corresponding to a native resolution of a sensor that acquired individual ones of the plurality of images, the zoomed-in view being presented simultaneously with the single p×q map or image.

22. The method of claim 14, wherein individual ones of the one or more hardware processors are disposed on the one or more airborne vehicles and/or distributed remotely from the one or more airborne vehicles.

23. The method of claim 14, further comprising providing the statistical information for presentation to the user in real-time during acquisition of the high-resolution image data by the one or more airborne vehicles.

24. The method of claim 14, wherein the image resolution is less than 5 centimeters/pixel, and wherein the method further comprises correcting the spectral images for changing conditions of ambient sun-light.

25. A system configured for aggregating and facilitating display of spatially variable data associated with a geographical region such as a map or image from multiple samples acquired by one or more airborne vehicles taken across sub-regions of the geographical region independent of data obtained from outside data sources, the system comprising:
  one or more hardware processors configured by machine-readable instructions to:
    obtain high-resolution image data of a geographical region acquired by one or more airborne vehicles, the image data comprising a plurality of spectral images corresponding to sub-regions of the geographical region, the plurality of spectral images being acquired at an image resolution corresponding to a first spatial frequency;
    correct the spectral images for changing conditions of ambient light;
    analyze individual ones of the plurality of the corrected spectral images to determine statistical information corresponding to the sub-regions of the geographical region, the analysis comprising:
      determining a spectrally-dependent reflectance of a target area across a plurality of discrete spatial samples; and
      classifying the plurality of discrete spatial samples as having signals reflected from an interior of live vegetation cells responsive to a ratio of the spectrally-dependent reflectance being within a predetermined range; and
    provide, for presentation to a user, the statistical information corresponding to the sub-regions of the geographical region by resampling the statistical information based on a second spatial frequency, the second spatial frequency being equal to or less than the first spatial frequency.

26. A method for aggregating and facilitating display of spatially variable data associated with a geographical region such as a map or image from multiple samples acquired by one or more airborne vehicles taken across sub-regions of the geographical region independent of data obtained from outside data sources, the method being performed by one or more hardware processors configured by machine-readable instructions, the method comprising:
  obtaining high-resolution image data of a geographical region acquired by one or more airborne vehicles, the image data comprising a plurality of images corresponding to sub-regions of the geographical region, the plurality of images being acquired at an image resolution corresponding to a first spatial frequency;
  correcting the spectral images for changing conditions of ambient light;
  analyzing individual ones of the plurality of the corrected spectral images to determine statistical information corresponding to the sub-regions of the geographical region, the analysis comprising:
    determining a spectrally-dependent reflectance of a target area across a plurality of discrete spatial samples; and
    classifying the plurality of discrete spatial samples as having signals reflected from an interior of live vegetation cells responsive to a ratio of the spectrally-dependent reflectance being within a predetermined range; and
  providing, for presentation to a user, the statistical information corresponding to the sub-regions of the geographical region by resampling the statistical information based on a second spatial frequency, the second spatial frequency being equal to or less than the first spatial frequency.

* * * * *